Sept. 25, 1951 R. E. HERR 2,569,001
HEDGE SHEAR
Filed Oct. 29, 1947
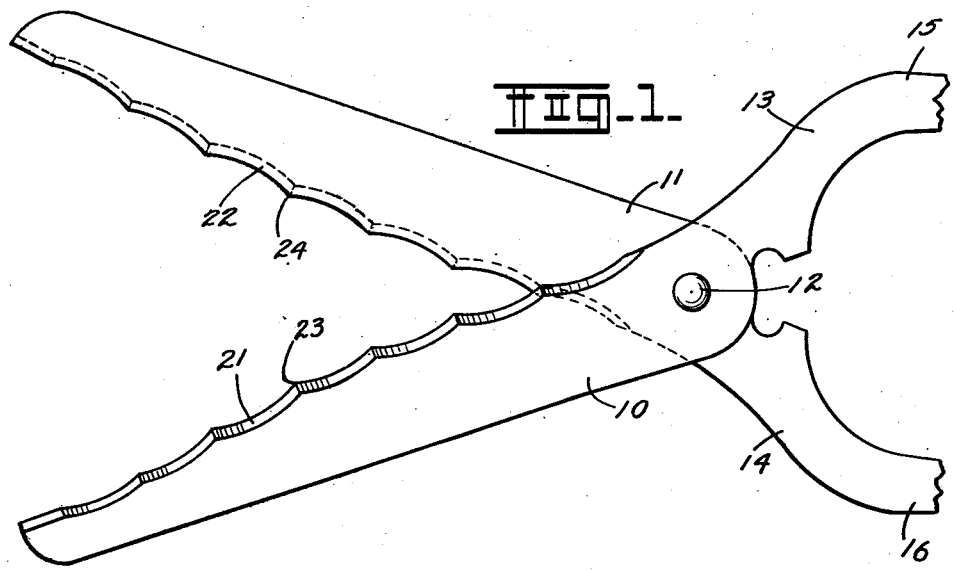
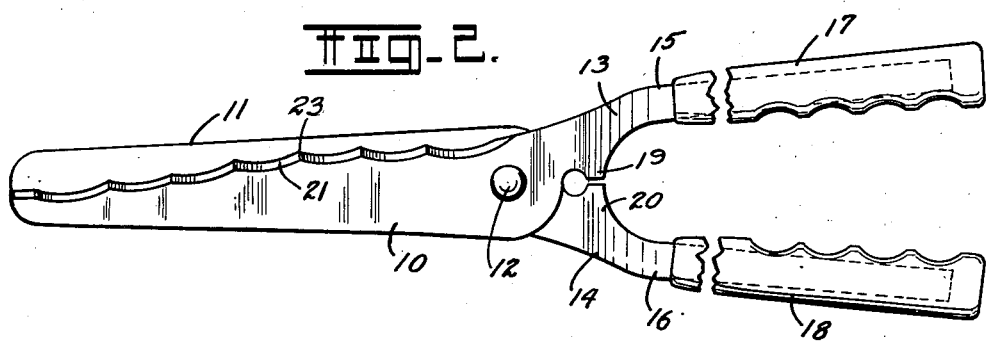
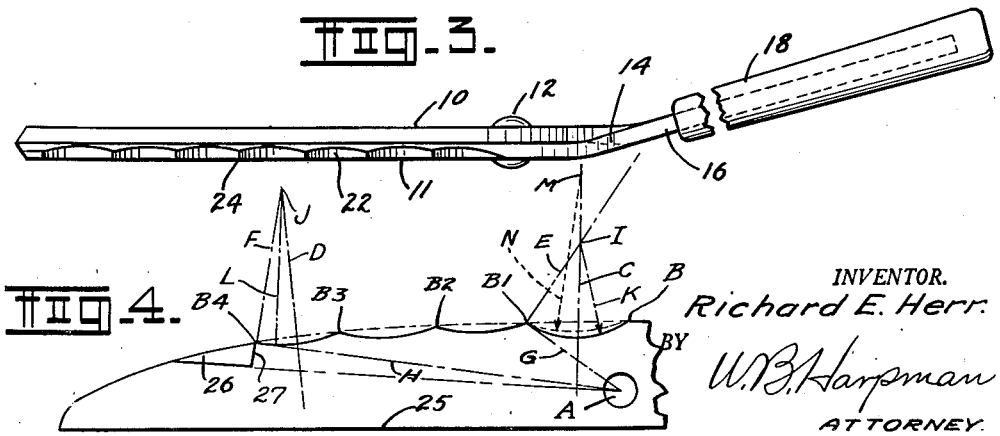
INVENTOR.
Richard E. Herr.
BY
W. B. Harpman
ATTORNEY.

Patented Sept. 25, 1951

2,569,001

UNITED STATES PATENT OFFICE 2,569,001

HEDGE SHEAR

Richard E. Herr, Alliance, Ohio, assignor to The Lewis Engineering and Manufacturing Company, Alliance, Ohio, a corporation of Ohio Application October 29, 1947, Serial No. 782,842

5 Claims. (Cl. 30—254)

This invention relates to a shear and more particularly to a shear having oppositely disposed, scalloped cutting blades particularly adapted for use as a hedge shear.

The principal object of the invention is the provision of a hedge shear having a pair of pivoted blades, the meeting edges of which are scalloped and the scallops formed so that a true shearing cut is obtained.

A further object of the invention is the provision of a method of forming a plurality of scallops in the opposed cutting edges of shear blades so as to enable a true shearing action to be obtained between the said shear blades despite the presence of the scallops therein.

A still further object of the invention is the provision of a hedge shear which will hold the work piece being cut therein in addition to cutting the same.

A still further object of the invention is the provision of a hedge shear adapted for heavy duty shearing action.

A still further object of the invention is the provision of a hedge shear which is efficient in operation, possessed of a long and useful life and of inexpensive formation.

The hedge shear shown and described herein comprises a heavy duty shear particularly adapted for trimming hedges and shrubbery and having the opposed cutting edges of the blades of the shears formed with a plurality of oppositely disposed scallops so positioned in the edges of the shear blades that despite their presence a continuous true shearing cut is obtained between the blades without the necessity of flights or risers on the points of the blade between the scallops as has heretofore been thought necessary in the formation of scalloped edge shear blades.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a top plan view of the blade portions of a pair of hedge shears.

Figure 2 is a top plan view of the hedge shear, on a reduced scale.

Figure 3 is a side elevation of the hedge shear shown in Figure 2.

Figure 4 is an enlarged detail of a portion of the hedge shear blade showing the manner of determining the location of the scallops therein.

By referring to the drawings and Figures 1, 2 and 3 in particular it will be seen that a hedge shear has been disclosed which comprises a pair of blades 10 and 11 pivoted to one another by means of a bolt 12, each of the blades 10 and 11 lying in oppositely disposed position to one another and having outwardly curved shank portions 13 and 14, respectively. The curved shank portions 13 and 14 terminate in handle sections 15 and 16, respectively, each of which in turn is provided with an overlying, molded handle 17 and 18, respectively. The curved shank portions 13 and 14 of the blades 10 and 11, respectively, are provided with oppositely disposed facing, stub-like projections 19 and 20, respectively, which are formed on the same transverse plane so that they will contact one another when the shear is in closed position as shown in Figures 2 and 3, thereby forming stop members.

Each of the blades 10 and 11 is provided with oppositely disposed shearing edges, which shearing edges are in turn scalloped longitudinally thereof, the scallops being indicated by the numerals 21 and 22, respectively and the cusps of the scallops being indicated by the numerals 23 and 24, respectively. It will be observed that the contour of each of the opposing scalloped edges of the blades 10 and 11 forms an arc whereby the blades 10 and 11 are narrower adjacent their outermost end portions than at their base portions where the pivot 12 is located.

By referring to Figure 4 of the drawings it will be seen that the positions of each of the scallops 21 and 22, respectively, are carefully plotted by the following method. The base of the blade 25 (as shown in Figure 4) is straight and the scalloped cutting edge thereof is formed on an arc 26 so that it is convex with relation to the straight base edge 25. A pivot bolt hole A is then established in the base portion of the blade. The length of the scallops to be formed in the arc 26 is then established, as indicated at B, B1, B2, B3, B4, etc.

To form the scallop closest the pivot bolt hole A end between the scallop point locations B and B1, a line G is drawn from the center of the pivot bolt hole A to point B1. The line G comprises a tangent line below which the scallop may not lie for true shear cut. A bisector line C of the scallop to be formed between point B and B1 is then drawn and a square positioned on the line G to form a true right angle with respect thereto (90°) based on the point BI and forming a line E intersecting the bisector line C, as shown, and establishing point I. The length of the line E between point BI and point I establishes the radius K of the scallop which is the minimum radius for true shear cut of the completed blade. To allow for manufacturing tolerances a slightly flatter scallop is preferably formed by establishing a larger radius such as shown at point M on the bisector line C and by the dotted radius line N. It will be obvious that the scallop thus formed on the pattern so established need not be a segment of a circle as shown, but may be of an ellipse or any other shape which does not lie below the tangent line G at any point.

In forming the relatively shallower scallop between the points B3 and B4 on the arc 26 of the blade (as shown in Figure 4) a tangent line H is drawn from the center point of the pivot bolt hole A to point B4, a bisector line D established midway between the points B3 and B4 and the right angle intersecting line F formed (with respect to the tangent line H) to intersect the bisector line D at point J thereon, thus establishing the point for the radius line L and thereby illustrating the formation of the shallower scallop between the points B3 and B4 as compared with the scallop formed between the points B and BI.

It will be obvious to those skilled in the art that by forming each of the scallops in the arc 26 of the blade so that no part thereof lies below (toward the straight base 25) the tangent lines (G or H, etc.) the resulting shear blade will be formed which, when used in pairs with the scallops in oppositely disposed relation as heretofore shown and described in connection with Figures 1, 2 and 3, will cut with a true shearing cut at all times. As the blades are in continuous shearing engagement at all times, no provision need be made for returning the blades to such engagement as has heretofore been necessary in the case of scalloped shear blades, the expedient heretofore commonly used comprising the formation of flights or risers on the bottom portions of the points of the blades to return the same to shearing engagement.

It will thus be seen that a simple and efficient hedge shear has been disclosed which possesses the unique advantage of having work gripping scallops formed in the opposed cutting blades thereof, the scalloped formation being so formed that the hedge shear cuts with a continuous shearing action which is a true shearing action as they are always in sliding shearing relation to one another despite the presence of the scallops in the cutting edges thereof.

Having thus described my invention, what I claim is:

1. In a shear having blades pivoted to one another and cutting edges formed on the opposed edges of the said blades, a plurality of scallops formed in the said cutting edges, each scallop lying wholly in the area between an imaginary line joining the cusps of the scallop and a tangent line drawn from the outermost cusp of the scallop to the center of the pivot point of the blades.

2. In a shear having blades pivoted to one another and cutting edges formed on the opposed edges of the said blades, a plurality of scallops formed in end to end relation in the said cutting edges, each scallop lying wholly in the area between the imaginary line joining the cusps of the scallop and a tangent line drawn from the outermost cusp of the scallop to the center of the pivot point of the blades.

3. In a shear having blades pivoted to one another and cutting edges formed in the opposed edges of the said arcuate blades, a plurality of scallops formed in the said cutting edges, the cusps of the scallops lying on an arc each scallop lying wholly in the area between an imaginary line joining the cusps of the scallop and a tangent line drawn from the outermost cusp of the scallop to the center of the pivot point of the blades.

4. In a shear having blades pivoted to one another and longitudinally arcuate shaped cutting edges formed on the said blades, the said arcuate shaped cutting edges lying in opposed relation to one another, a plurality of scallops formed in end to end relation in the arcuate shaped cutting edges of each of the said blades, each of the plurality of scallops lying wholly in the area between an imaginary arcuate line joining the cusps of the scallops and a tangent line drawn from the outermost cusp of each scallop to the center of the pivot point of the blades.

5. The method of forming a shear blade for use in pivoted opposed pairs wherein a continuous shearing cut is obtained comprising blanking of the cutting edge of the shear blade on an arc, establishing locations longitudinally of the arc defining spacing for scallops to be formed in the blade, punching a pivot opening in the blade, laying out a plurality of lines from the center of said pivot opening to the said spacing locations, laying out bisector lines in each of the scalloped locations and laying out right angle lines at 90 degrees from the said first mentioned lines to points of intersection on the said bisector lines and thereby determining the minimum radius of the said scallops to be formed and cutting the scallops on the said minimum radius lines.

RICHARD E. HERR.

REFERENCES CITED

The following references are of record in the file of this patent:

UNITED STATES PATENTS

| Number | Name | Date |
| --- | --- | --- |
| 399,869 | Gascoigne | Mar. 19, 1889 |
| 1,970,408 | Weidauer | Aug. 14, 1934 |

FOREIGN PATENTS

| Number | Country | Date |
| --- | --- | --- |
| 258,452 | Great Britain | Sept. 23, 1926 |